Sept. 3, 1940.   D. M. BERGES   2,213,358
ELECTRICAL SYNCHRONIZING SYSTEM
Filed Dec. 27, 1938
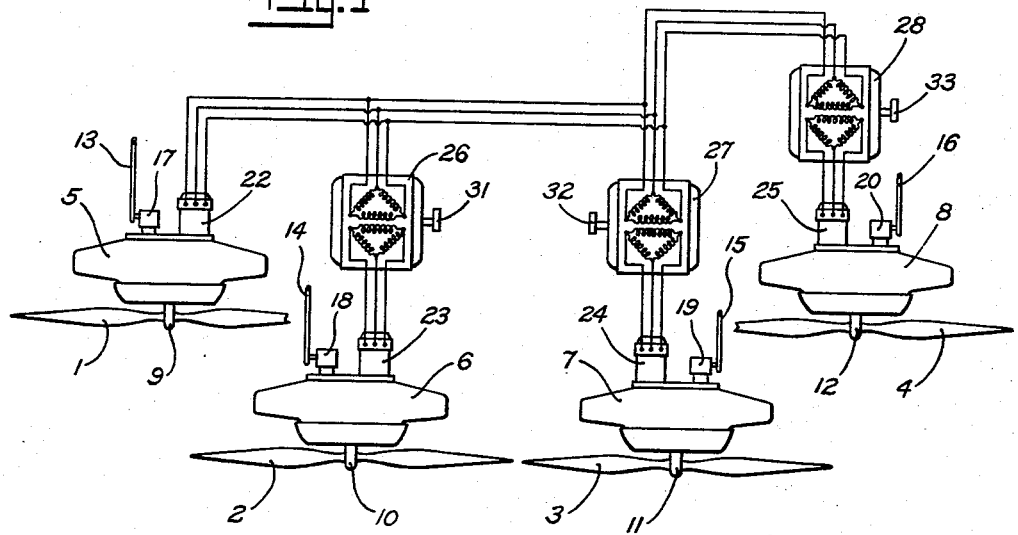
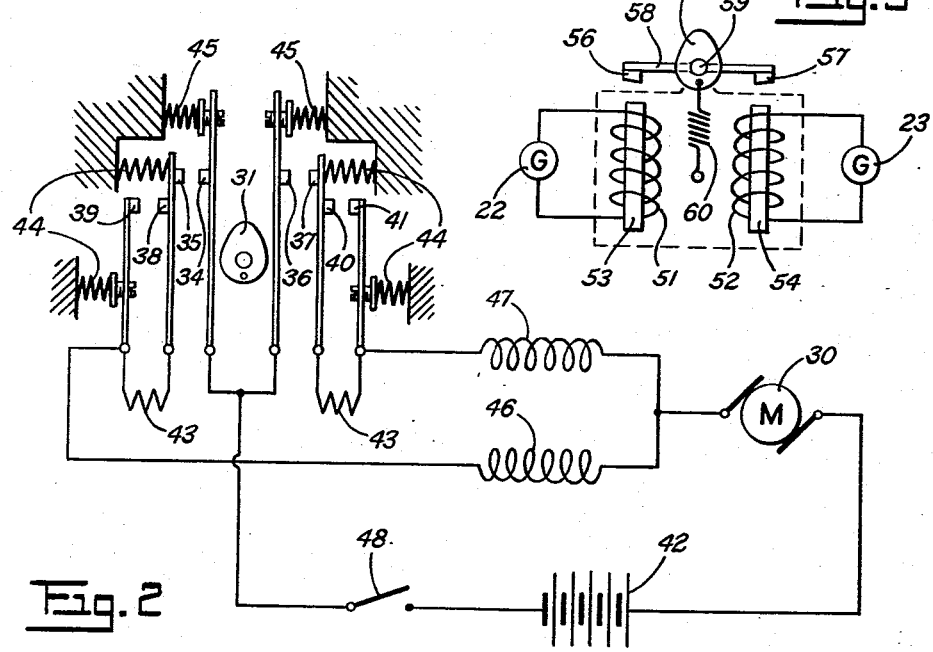
INVENTOR.
Donald M. Berges
BY
Martin J. Finnegan
ATTORNEY.

Patented Sept. 3, 1940

2,213,358

UNITED STATES PATENT OFFICE 2,213,358

ELECTRICAL SYNCHRONIZING SYSTEM

Donald M. Berges, Alpine, N. J., assignor to Bendix Aviation Corporation, South Bend, Ind., a corporation of Delaware Application December 27, 1938, Serial No. 248,021

5 Claims. (Cl. 60—97)

The present invention relates to apparatus for electrically synchronizing the engines and propellers of a multi-engine aircraft.

One of the objects of the invention is to provide novel electrical apparatus for automatically controlling the speed control means of a plurality of aircraft engines each driving a respective propeller, so that said propellers will normally rotate in synchronism.

Another object is to provide novel electrical apparatus for automatically controlling the speed control means of a plurality of aircraft engines so that they will continuously operate in synchronism with a master engine the operation of which is controlled manually to maintain a predetermined speed whereby all of said engines will operate in fixed speed relation thereto.

Another object is to provide a novel electrical apparatus for maintaining a plurality of propellers of a multi-engine aircraft at the same predetermined speed.

Another object of the invention is to provide a novel electrical control apparatus for the internal combustion engines of a multi-engine aircraft whereby manual operation of the individual engine throttles is rendered normally unnecessary, thus reducing the pilot's labors and consequently increasing the safety factor in air travel.

A further object is to provide synchronism deviation responsive means of such a character that the restoration to synchronism occurs by reason of operation of a restoring device whose movements occur with progressively increasing rapidity until the deviation tendency is reversed, and thereafter with progressively less rapidity until absolute synchronism is restored; the net effect being to decrease the time interval for correction of the asynchronous condition, also to minimize the possibility of occurrence of a "hunting" condition, or an over-control.

Another object of the invention is to produce electrical synchronizing means in which the electrically inter-acting elements are normally stationary, and move only when asynchronism occurs; the result being an important economy in operating expense and a freedom from many of the difficulties that inevitably attend upon use of constantly rotating elements.

Other objects and advantages of the invention will appear more fully hereinafter from a consideration of the detailed description which follows, taken together with the accompanying drawing wherein the preferred embodiment of the invention is illustrated. It is to be expressly understood, however, that the drawing is for the purposes of illustration and description only and is not designed as a definition of the limits of the invention, reference being had for this purpose to the appended claims.

The invention consists substantially in the construction, combination, location and relative arrangement of parts and electrical circuits as set forth in the specification, shown in the drawing, by way of example, and finally pointed out in the claims.

In the drawing, wherein like reference characters refer to like parts throughout the several views:

Figs. 1 and 2, viewed collectively, schematically illustrate the preferred embodiment of the invention as applied to a four engine aircraft; and Fig. 3 is a diagrammatic indication of a modified form of electric differential, interchangeable with the preferred form of electric differential shown in Figs. 1 and 2.

As illustrated in the drawing, this invention is shown as applied to a propelling system consisting of four propellers 1, 2, 3, and 4 driven by the internal combustion engines 5, 6, 7, and 8 respectively. These propellers are illustrated as being directly connected to the power shafts 9, 10, 11, and 12 of the respective engines 5, 6, 7, and 8, and these engines are each shown as provided with throttle linkages 13, 14, 15, and 16, the said throttle linkages cooperating with the carbureters 17, 18, 19, and 20, respectively, to vary the speeds of the respective engines individually by varying the fuel feed thereto.

Directly and positively connected by means of gears or the like, at the rear of the engines 5, 6, 7, and 8, are small alternating current generators numbered 22 to 25 for the respective engines. It is essential that these generators be geared or coupled to the engines 5, 6, 7, and 8, respectively, in such manner that each generator will be operated at a speed directly proportional to the speed of the propeller with which it is associated. These generators 22, 23, 24, and 25 are electrically identical and are each provided with conventional slip rings and/or brushes to which are connected the conductors leading from the respective generators. It will be seen from the above that each of the generators 22, 23, 24, and 25 (if of the A. C. type) will be caused to produce an alternating electromotive force the frequency of which will vary in direct proportion to the speed of the propeller with which any particular generator is associated.

The normally stationary, electrically interacting elements above referred to are shown as electric differentials 26, 27, and 28 in Fig. 1; each of said units having a rotor and stator, with windings in circuit with the generator 22 on the one hand, and with one of the generators of the series 23, 24, 25 on the other. Accordingly, if the speed of any one of the secondary engines 6, 7, and 8 differs from that of the master engine 5 the resulting disturbance of the normal dynamic balances between rotor and stator of the corresponding electric differential (26, 27, or 28, as the case may be) will cause said rotor to turn slightly, the direction of the turn being dependent upon whether the secondary engine speed deviates in the upward or downward direction from that of the master engine. After turning a few degrees the associated cam (31, 32, or 33, as the case may be) will engage and close the inner set of contacts (34, 35 or 36, 37, depending upon whether the turning is clockwise or counterclockwise) whereby a circuit leading, as indicated in Fig. 2, from a source 42 to a speed correcting motor 30 is energized. Energization of this motor 30 will result in introduction of a speed correcting movement for either the engine throttle or the propeller-pitch-changing mechanism according to which method is employed for bringing the engine back to the predetermined speed corresponding to that of the master engine.

As above noted, it is desired to have the speed correcting movement occur with progressively increasing rapidity until the deviation tendency is reversed, and thereafter with progressively less rapidity until synchronism is restored. As shown this involves additional sets of contacts closeable by further stages of movement of the cam (31, 32 or 33, of which only 31 is shown in Fig. 2) from its normal position; one of such additional sets of contacts being shown at 38, 39 and another at 40, 41. Closure of either of these outer sets of contacts operates to cut out of the circuit a particular resistor 43 (or combination of resistors, not shown) whereby the motor is caused to run at a higher speed and therefore tends to provide a quicker correction in the speed of the deviating engine, such higher speed rotation continuing until the correcting action proceeds far enough to reduce the disparity in frequencies (and hence the developed torque) sufficiently to permit reopening of the second (outer) set of contacts by the action of a spring 44 which normally holds said contacts open. From this point until completion of the correcting operation the motor runs at the lower speed governed by the first set of contacts (34, 35 or 36, 37 as the case may be). This latter set of contacts likewise opens when the correction has been so nearly completed as to substantially eliminate all torque application. The cam now returns to the normal position under the influence of a centering spring (not shown) or its equivalent, said return being also facilitated by the action of the springs 45. By adjusting the load on the controlling springs 44 and 45, each set of contacts can be made to operate at any desired speed differential. In this manner provision is made for offsetting the possible effect of over-travel of the correcting mechanism, or any hunting tendency thereof. The direction of rotation of motor 30 is controlled by the motor field windings 46 and 47, one of which is in circuit with the right-hand cam contacts, while the other is in circuit with the left-hand cam contacts. A hand-switch 48 is provided for each speed correcting motor, whereby any one of said motors may be cut out of the synchronizing system whenever desired; it being understood that cams 32 and 33 operate upon such additional speed correcting motors in the manner in which cam 31 operates upon motor 30.

In Fig. 3 is shown a modified form of electric differential which may be substituted for that shown at 26 in Figs. 1 and 2 (with duplicates thereof substituted for 27 and 28). Referring to said Fig. 3 there is shown therein a pair of windings 51, 52, for corresponding electro-magnetic devices 53, 54, the latter being adapted to exercise magnetic control over opposite ends 56, 57, respectively, of a shiftable and magnetizable rocker 58, pivotally mounted on a rockshaft 59, and normally held by suitable means 60, in a position wherein the ends of the rocker are at equal distances from the cores of the electromagnets 53, 54. With this arrangement, and assuming that the winding 51 is in circuit with the master engine operated generator 22 of Fig. 1 so as to be energized thereby, and that the other winding 52 of solenoid 54 is in circuit with one of the controlled engine generators of Fig. 1, it will be seen that the magnetic impulses to the two solenoids will occur synchronously when the associated engines are in synchronism and non-synchronously when they are not. So long as the impulses are in synchronism the magnetic pull on one end of the rocker arm will exactly balance the magnetic pull on the other and there will therefore be no shifting of the rocker; but on creation of a condition of non-synchronism as to said impulses, the solenoid which is subjected to the greater number of impulses per unit of time will operate at higher voltage and thereby succeed in drawing the rocker toward it, thus producing a corresponding rotation of the rockshaft 59 and a corresponding movement of the cam 31' mounted thereon and corresponding to the cam 31 of Fig. 2 in its structure, operation and effect in energization of the speed correcting motor 30 of Fig. 2. Again, if generators 22 and 23 be of the D. C. type, the effect on rocker 58 will be the same, with movement thereof occurring whenever a difference in engine speeds causes the voltage across winding 51 to differ from that across winding 52.

Motors 30 may control speed by means of propeller blade shifting in the conventional manner, as indicated in Turnbull Patent No. 1,828,348; or they may actuate the corresponding throttle rods through slip connections permitting manual "over-control" as in Moross Patent No. 2,087,291.

What I claim is:

1. In combination with a pair of aircraft engines, one of which has a speed varying mechanism associated therewith, said mechanism including an electric motor and a normally open circuit for energization thereof, and electromagnetic means responsive to a deviation in the speed of one of said engines from that of the other to close said normally open circuit and thereby energize said motor, said last-named means including inductively associated windings having a normally fixed physical relationship, one to the other, a circuit-closing cam movable along a relatively short arc of movement whenever one of said windings receives energizing impulses at higher frequency than the other, and means for causing said motor to operate at progressively increasing speed until the speed deviation tendency reverses, and thereafter at progressively decreasing speed until synchronism is restored.

2. In combination with a plurality of aircraft engines, certain of which have a speed varying mechanism associated therewith, said mechanism including an electric motor and an open circuit for energization thereof, and electromagnetic means responsive to a deviation in the speed of one of said engines from that of another to close said open circuit and thereby energize said motor, said last-named means including separately energized windings, a circuit-closing cam movable along a relatively short arc of movement whenever one of said windings receives a larger total of electric energy than the other, and means for causing said motor to operate at progressively increasing speed until the speed deviation tendency reverses, and thereafter at progressively decreasing speed until synchronism is restored.

3. In combination with a plurality of aircraft engines, certain of which have a speed varying mechanism associated therewith, said mechanism including an electric motor and an open circuit for energization thereof, and electromagnetic means responsive to a deviation in the speed of one of said engines from that of another to close said open circuit and thereby energize said motor, said last named means including separately energized windings, a circuit-closing cam movable along a relatively short arc of movement whenever one of said windings receives a larger total of electric energy than the other, and means for causing said motor to operate at progressively increasing speed until the speed deviation tendency reverses, and thereafter at progressively decreasing speed until synchronism is restored.

4. In combination with a plurality of aircraft engines, certain of which have a speed varying mechanism associated therewith, said mechanism including an electric motor and an open circuit for energization thereof, and electromagnetic means responsive to a deviation in the speed of one of said engines from that of another to close said open circuit and thereby energize said motor, said last-named means including separately energized windings, a circuit-closing cam movable along a relatively short arc of movement whenever one of said windings receives energizing impulses at higher frequency than the other, and means for causing said motor to operate at progressively increasing speed until the speed deviation tendency reverses, and thereafter at progressively decreasing speed until synchronism is restored.

5. In combination with a plurality of aircraft engines, certain of which have a speed varying mechanism associated therewith, said mechanism including an electric motor and an open circuit for energization thereof, and electromagnetic means responsive to a deviation in the speed of one of said engines from that of another to close said open circuit and thereby energize said motor, said last named means including separately energized windings, a circuit-closing cam movable along a relatively short arc of movement whenever the voltage impressed upon one of said windings exceeds that impressed upon the other, and means for causing said motor to operate at progressively increasing speed until the speed deviation tendency reverses, and thereafter at progressively decreasing speed until synchronism is restored.

DONALD M. BERGES.